(12) United States Patent
Corder

(10) Patent No.: US 8,129,046 B2
(45) Date of Patent: Mar. 6, 2012

(54) INTRINSICALLY SAFE BATTERY PACK AND SYSTEM

(75) Inventor: Rodney Corder, Chesterton, IN (US)

(73) Assignee: Dwyer Instruments, Inc., Michigan City, IN (US)

(*) Notice: Subject to any disclaimer, the term of this patent is extended or adjusted under 35 U.S.C. 154(b) by 798 days.

(21) Appl. No.: 12/202,720

(22) Filed: Sep. 2, 2008

(65) Prior Publication Data

US 2010/0055549 A1    Mar. 4, 2010

(51) Int. Cl.
*H01M 2/10* (2006.01)
*H01M 2/20* (2006.01)

(52) U.S. Cl. .............. 429/97; 429/7; 429/10; 429/123; 429/187

(58) Field of Classification Search .............. None
See application file for complete search history.

(56) References Cited

U.S. PATENT DOCUMENTS

| | | |
|---|---|---|
| 3,686,530 A | 8/1972 | Bogut |
| 3,760,312 A | 9/1973 | Shlesinger, Jr. |
| 3,864,173 A | 2/1975 | Butschkau |
| 4,187,483 A | 2/1980 | Whitney |
| 4,380,704 A | 4/1983 | Wisda |
| 4,580,062 A | 4/1986 | MacLaughlin |
| 4,638,396 A | 1/1987 | Mukli et al. |
| 4,749,934 A | 6/1988 | Alexander et al. |
| 4,810,204 A | 3/1989 | Wilson |
| 5,335,133 A | 8/1994 | Bishop et al. |
| 7,113,063 B2 | 9/2006 | Romanik et al. |
| 2003/0201738 A1 | 10/2003 | Yamamoto |
| 2006/0228919 A1 | 10/2006 | Marukawa et al. |
| 2008/0268330 A1* | 10/2008 | Hansen et al. .................. 429/97 |

FOREIGN PATENT DOCUMENTS

| | | |
|---|---|---|
| JP | 2002-175791 | 6/2002 |
| WO | WO 2006/118612 | * 11/2006 |

OTHER PUBLICATIONS

English Abstract of Japanese Publication No. JP2002175791, Jan. 21, 2002.

* cited by examiner

*Primary Examiner* — Jonathan Crepeau
(74) *Attorney, Agent, or Firm* — Barnes & Thornburg LLP

(57) ABSTRACT

A battery pack system may include a battery pack and a battery pack holder. The battery pack holder receives the battery pack and couples a battery pack terminal to a load associated with the battery pack holder. The battery pack includes an operation handle external to a battery pack housing. The operation handle is coupled to an operation member via an operation shaft that passes through the housing. A safety circuit of the battery pack couples power supplied by a battery to battery pack terminals based upon position of the operation handle. An operation member of the battery pack extends a locking member into an opening of the battery pack holder when the operation handle is in the engaged position, and retracts the locking member from the opening when the operation handle is in the disengaged position.

18 Claims, 4 Drawing Sheets

INTRINSICALLY SAFE BATTERY PACK AND SYSTEM

BACKGROUND

An intrinsically safe battery pack may include a built-in safety circuit to prevent arcing during installation and/or removal of the battery pack. One such battery pack includes a safety circuit that de-energizes terminals of the battery pack when an operator turns off the unit powered by the battery pack. However, if the operator fails to turn off the unit prior to removing or installing the battery pack, the operator runs the risk of arcing which may have catastrophic results in certain hazardous environments (e.g. an oil refinery).

In another battery pack, a safety circuit introduces a time delay between detecting an applied load to the battery pack and energizing the terminals of the battery pack. When the operator turns the unit on, the battery pack energizes the terminals after a time delay. The time delay permits, the battery pack to be installed in a unit that is turned on without an arcing potential. Removal, however, still runs the risk of arcing if the unit is not turned off.

Installation of battery packs in wireless sensors of a sensor networks may present additional obstacles. Wireless sensors typically do not have an on/off switch. As such, the operator commonly is unable to turn off the wireless sensor prior to installation and/or removal of a battery pack. Moreover, the operator commonly can not wait until the battery of the battery pack is exhausted prior to replacing the battery pack.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or similar elements.

DETAILED DESCRIPTION OF THE DRAWINGS

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Figure 1:
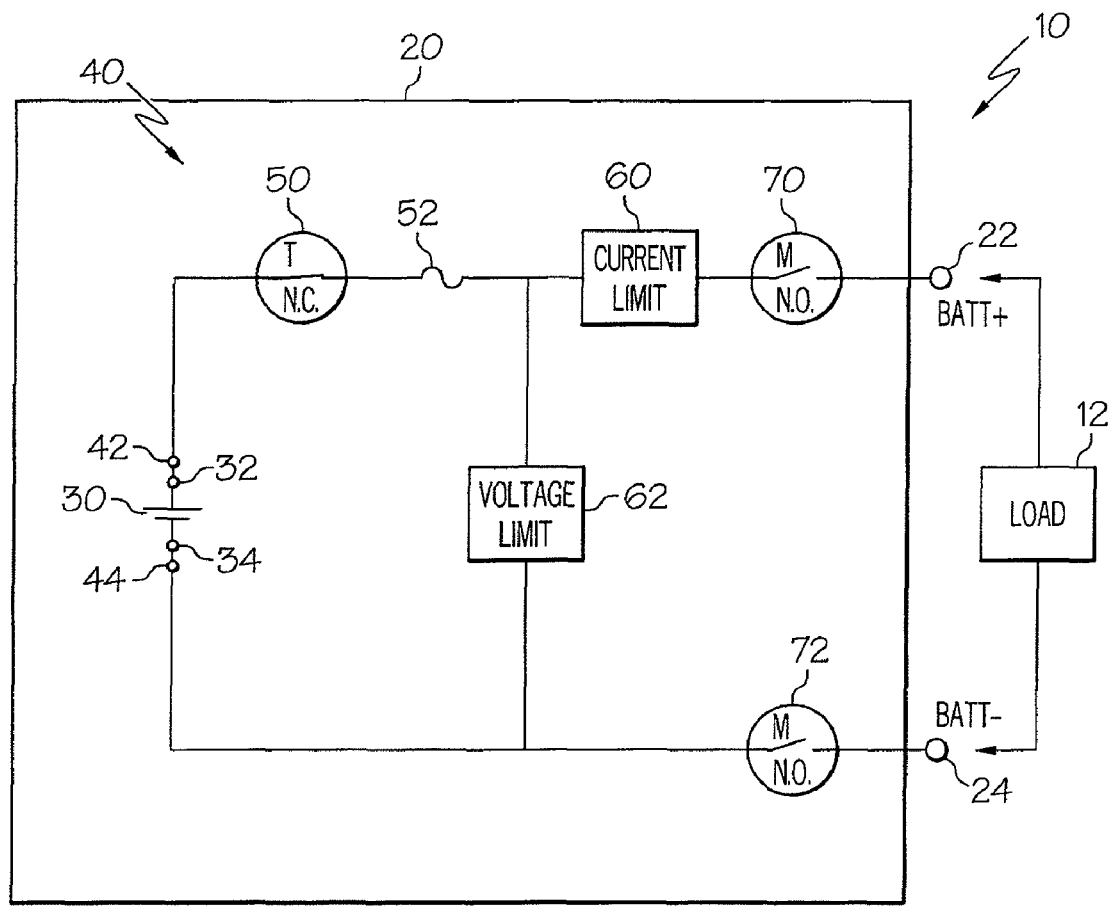
FIG. 1 shows a circuit diagram of an embodiment of a battery pack used to power a load.

An embodiment of a battery pack 10 used to power a load 12 is shown in FIG. 1. The battery pack 10 may comprise an enclosure or housing 20 that houses a battery 30 and safety circuit 40. The safety circuit 40 may operatively couple the battery 30 to a positive battery pack terminal 22 and a negative battery pack terminal 24 external to the housing 20. The positive battery pack terminal 22 and the negative battery pack terminal 24 may be detachably coupled to the load 12.

The battery 30 may provide power to the load 12 via the safety circuit 40 and the terminals 22, 24. In one embodiment, the battery 30 includes one or more primary cells such as Tadiran model TL-5903, size AA Lithium Thionyl Chloride (Li/SOCl2) batteries. Moreover, the cells of the battery 30 may have low self-discharge and long shelf lives which are useful for powering low powered wireless sensor loads. Other embodiments, however, may use other types of primary cells or even rechargeable cells.

The safety circuit 40 may include a positive battery interface terminal 42 to interface and electrically couple to a positive battery terminal 32 of the battery 30 and a negative battery interface terminal 44 to interface and electrically couple to a negative battery terminal of the battery 30. The safety circuit 40 may further include a thermal switch 50 in series with the positive battery interface terminal 42. In one embodiment, the thermal switch 50 is biased in a closed position and activates to an open position in response to an over-temperature condition. In particular, the thermal switch 50 may be placed in close thermal contact with the battery 30 and may protect the battery 30 from over-temperature conditions. An over-temperature condition may occur in response to various events such as, for example, (i) a fault in the battery 30 may cause a high internal temperature, or (ii) ambient temperature of battery pack 10 may exceed a threshold temperature associated with an upper limit of a safe operating range.

The safety circuit 40 may further include a fuse 52 and voltage limit 62. As shown, the fuse 52 may be placed in series with the positive battery interface terminal 42 and the thermal switch 50. The voltage limit 62 may be placed in parallel with the series combination of the positive battery interface terminal 42, the thermal switch 50 and the fuse 52. The voltage limit 62 may begin conducting in response to the voltage across the voltage limit 62 exceeding a threshold voltage $V_t$. The voltage limit 62 may be designed such that the threshold voltage $V_t$ protects the battery pack 10 and the load 12 from voltages beyond safe operating levels. In one embodiment, the voltage limit 62 may comprise one or more Zener diodes in parallel that begin conducting when the voltage across the parallel Zenner diodes exceeds a selected threshold voltage $V_t$.

The fuse 52 may protect the battery pack 10 and the load 12 from potentially high overcurrent conditions. For example, a high overcurrent condition may occur in response to a flow of current through the voltage limit 62 due to the voltage across the voltage limit 62 exceeding the threshold voltage $V_t$ of the voltage limit 62. In the event of a high overcurrent condition, the fuse 52 may either permanently or temporarily open depending on its construction. The fuse 52 may be selected with a current rating at the lower of a maximum safe operating current for the battery 30 or a maximum current allowed by safety requirements of an operating environment.

The safety circuit 40 may further include a current limit 60. The current limit 60 may be placed in series between the voltage limited, thermally and overcurrent protected battery 30 and either the positive battery pack terminal 22 or the negative battery pack terminal 24. The current limit 60 may provide additional overcurrent protection for the battery 30 and the load 12. In one embodiment, the current limit 60 may provide a low impedance path between the battery 30 and the positive battery pack terminal 22 while the load current is below a safety threshold. As the load current increases above the safety threshold, the impedance presented by the current limit 60 may increase in an attempt to prevent the load current from exceeding a safety threshold. When the battery 30 comprises a primary battery, the current limit 60 may also preclude current from flowing from the battery pack terminals 22, 24 to the battery 30. In one embodiment in which the battery 30 comprises a rechargeable battery, the current limit 60 may provide a current limiting function for current flowing from the battery pack terminals 22, 24 to the battery 30, further protecting the battery 30 from damage.

As shown, the safety circuit 40 may further comprise a positive terminal switch 70 and a negative terminal switch 72. The positive terminal switch 70 may be placed in series with the voltage limited, thermally and overcurrent protected battery 30 and the positive battery pack terminal 22. The negative terminal switch 72 may be placed in series with the voltage limited, thermally and overcurrent protected battery 30 and the negative battery pack terminal 24. In one embodiment, each of the terminal switches 70, 72 include a magnetically operated, normally open reed switch which closes under the influence of a magnetic field. Moreover, the presence of both a positive terminal switch 70 and a negative terminal switch 72 may provide single fault tolerance. More specifically, if either the positive terminal switch 70 or the negative terminal switch 72 fail closed, the other functioning terminal switch may still prevent the battery 30 from supplying a voltage potential between the positive battery pack terminal 22 and the negative battery pack terminal 24. A voltage potential between the battery pack terminals 20, 22 when the battery pack 10 is not coupled to load 12 may result in an unsafe condition in a hazardous environment. While the embodiment of the battery pack 10 shown in FIG. 1 includes two terminal switches 70, 72, other embodiments of a battery pack may be implemented with only a positive terminal switch or a negative terminal switch.

Figure 2A:
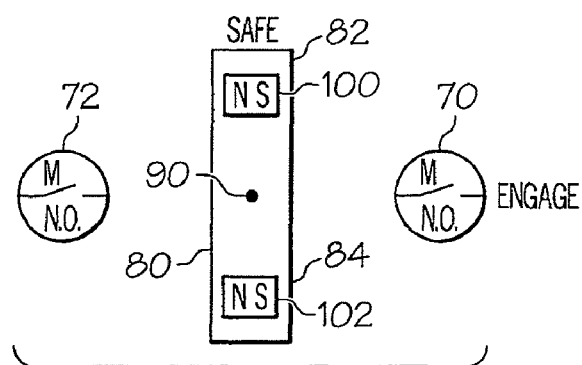
FIG. 2a shows switch operation of the battery pack of FIG. 1 in response to an operation member of the battery pack being placed in a safe or disengaged position.
Figure 2B:
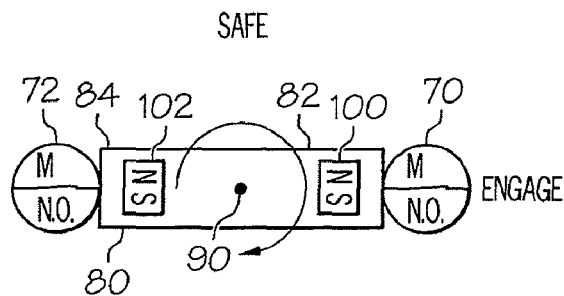
FIG. 2b shows switch operation of the battery pack of FIG. 1 in response to an operation member of the battery pack being placed in an engaged position.

As shown in FIGS. 2a and 2b, the terminal switches 70, 72 in one embodiment may comprise reed switches that may be actuated by magnets 100, 102 of an operation member 80. In particular, FIG. 2a shows the operation member 80 in a disengaged or safe position in which the battery 30 is disengaged from the battery pack terminals 20, 22 of the battery pack 10 thus preventing the battery 30 from supplying power to the battery pack terminals 20, 22. FIG. 2b conversely shows the operation member 80 in an engaged position in which the battery 30 is engaged with the battery pack terminals 20, 22 of the battery pack 10, thus permitting the battery 30 to supply power to the battery pack terminals 20, 22.

The operation member 80 may comprise a rod, cylinder, or some other shaped component having distal portions 82, 84 that rotate about an operation shaft 90. The operation member 80 may further include magnets 100, 102 positioned radially away from the operation shaft 90 and near the distal portions 82, 84 of the operation member 80. As a result of positioning the magnets 100, 102 radially away from the operation shaft 90, the operation member 80 may position the magnets 100, 102 away from the terminal switches 70, 72 as a result of being rotated to the disengaged position of FIG. 2a and may position the magnets 100, 102 close to the terminals switches 70, 72 as a result of being rotated to the engaged position of FIG. 2b.

In one embodiment, the terminal switches 70, 72 are biased in an open position; however, under the presence of an appropriate magnetic field, the terminals switches 70, 72 are activated to a closed position. In such an embodiment, the operation member 80 in the disengaged or safe position may place the magnets 100, 102 far enough away from the reed switches 70, 72 such that magnetic field received by the terminal switches 70, 72 is insufficient to close the terminal switches 70, 72 as shown in FIG. 2a. While the operation member 80 is in the disengaged position, the terminal switches 70, 72 remain open and prevent the battery 30 from applying a voltage to the battery pack terminals 20, 22. Thus, the disengaged position may present a condition suitable for transporting, installing and/or removing the battery pack 10 from a load 12 that is in a hazardous environment.

FIG. 2b illustrates operation of the terminal switches 70, 72 when the operation member 80 is rotated to the engaged position. In the engaged position, the operation member 80 places the magnet 100 in close proximity to the positive terminal switch 70 and the magnet 102 in close proximity to the negative terminal switch 72, causing each of the switches 70, 72 to activate to their respective closed position. In one embodiment the fully engaged position of the operation member 80 is 90 degrees offset from the fully disengaged position. However, in some embodiments, the strength and positioning of the magnets 100, 102 may close or partially close the terminal switches 70, 72 prior to the operation member 80 fully reaching the 90 degree offset from the disengaged base line. Similarly, in some embodiments, the strength and positioning of the magnets 100, 102 may result in the terminal switches 70, 72 opening prior to the operation member 80 fully returning to the disengaged base line. The positive terminal switch 70 and the negative terminal switch 72 in their closed position permit voltage to be developed across, and current to flow through the positive battery pack terminal 22 and negative battery pack terminal 24 to provide power to the load 12.

Figure 3:
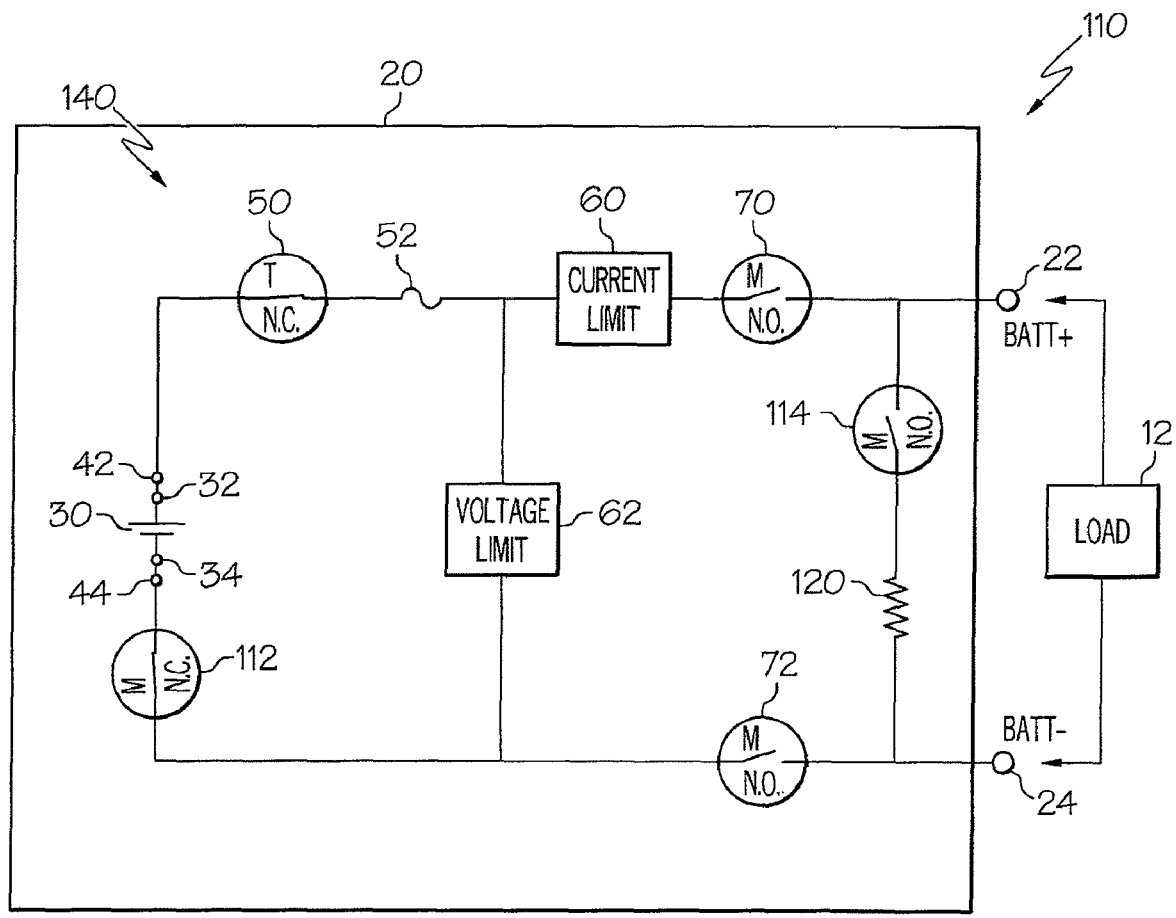
FIG. 3 shows a circuit diagram of another embodiment of a battery pack used to power a load.

Referring now to FIG. 3, another embodiment of a battery pack 110 suitable for use in a hazardous environment is shown. The battery pack 110 of FIG. 3 is similar in construction to the battery pack 10 of FIG. 1. As such, components of the battery pack 110 which are similar to components of battery pack 10 are depicted in FIG. 1 and FIG. 3 with common reference numerals. Moreover, such similar components are not further described except where such description aids in identifying differences between the battery packs 10, 110 and/or aids in the understanding of the implementation of battery pack 110.

As shown, besides the similar components of battery pack 10, the safety circuit 140 of the battery pack 110 further includes a battery disconnect switch 112, a terminal shunt switch 114 and a terminal shunt resistor 120. As shown, the battery disconnect switch 112 may be placed in series with the battery 30. The battery disconnect switch 112 may be biased to a closed position to permit current flow when not activated. When activated, the battery disconnect switch 112 may open to prevent current flow from the battery 30 to the battery pack terminals 22, 24. In one embodiment, the battery disconnect switch 112 may be activated by an appropriate magnetic field. In particular, the battery disconnect switch 112 may include a reed switch that is biased in the closed position but opens in response to the appropriate magnetic field.

The terminal shunt switch 114 and the terminal shunt resistor 120 may be provided in series, and the combination in parallel with the positive battery pack terminal 22 and the negative battery pack terminal 24. The terminal shunt switch 114 may be biased to an open position to prevent current flow through the terminal shunt resistor 120. When activated, the terminal shunt switch 114 may close to permit current to flow through the terminal shunt resistor 120 in order to dissipate stored charge in the load 12. In one embodiment, the terminal shunt switch 114 may be activated by an appropriate magnetic field. In particular, the terminal shunt switch 114 may include a reed switch that is biased in an open position but closes in response to the appropriate magnetic field.

The value of the terminal shunt resistor 120 in one embodiment has a low resistance (e.g. between about 5 and about 100 ohms) to quickly discharge any potential between the positive battery pack terminal 22 and the negative battery pack terminal 24. Moreover, in one embodiment, the terminal shunt resistor 120 has a low enough resistance that, in the event the positive terminal switch 70, the negative terminal switch 72 and the terminal shunt switch 114 are all activated, either the current limit 60 or the fuse 52 activate to minimize voltage potential across the positive battery pack terminal 22 and the negative battery pack terminal 24 in a fault condition.

Figure 4A:
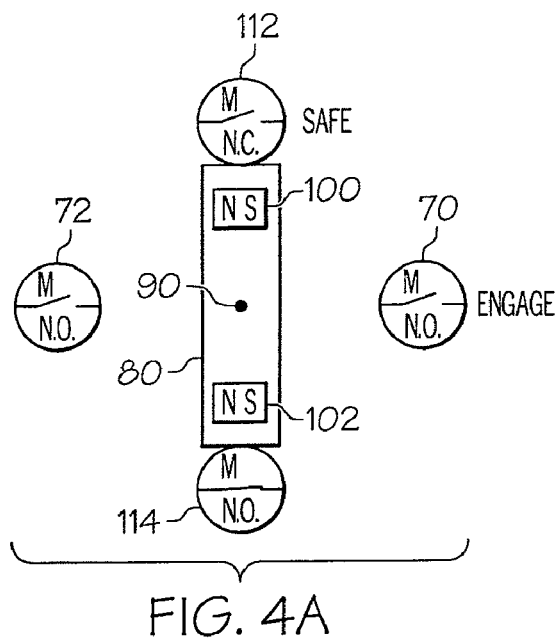
FIG. 4a shows switch operation of the battery pack of FIG. 3 in response to an operation member of the battery pack being placed in a safe or disengaged position.

FIG. 4a shows operation of the switches 70, 72, 110, 112 when the operation member 80 is in a disengaged/safe position. As shown, when in the disengaged position, the operation member 80 places the magnets 100, 102 away from the positive terminal switch 70 and the negative terminal switch 72 allowing them to be in their normally open position. Furthermore, the operation member 80 places the magnet 100 in close proximity to the battery disconnect switch 112, thus opening the switch 112 and disconnecting the battery 30 to prevent current flow. Moreover, the operation member 80 places the magnet 102 in close proximity to terminal shunt switch 114, thus closing the switch 114 and allowing current to flow between the positive battery pack terminal 22 and the negative battery pack terminal 24 through the terminal shunt resistor 120. Thus, any voltage potential difference between the positive battery pack terminal 22 and the negative battery pack terminal 24 may be dissipated as heat as current flows through the terminal shunt resistor 120.

Figure 4B:
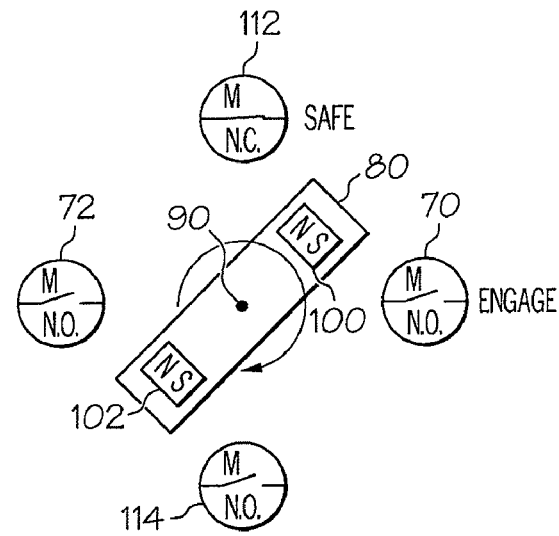
FIG. 4b shows switch operation of the battery pack of FIG. 3 in response to an operation member of the battery pack being placed in an intermediate position between an engaged position and a disengaged position.
Figure 4C:
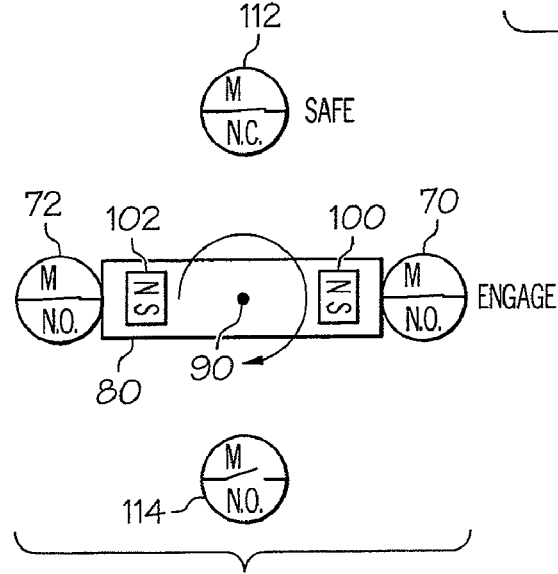
FIG. 4c shows switch operation of the battery pack of FIG. 3 in response to an operation member of the battery pack being placed in an engaged position.

FIG. 4b illustrates operation of the switches 70, 72, 112, 114 when the operation member 80 is in an intermediate position between the disengaged position of FIG. 4a and the engaged position of FIG. 4c. As shown, when in the intermediate position, the operation member 80 places the magnets 100, 102 sufficiently distant from the positive terminal switch 70, the negative terminal switch 72, the battery disconnect switch 112 and the terminal shunt switch 114 to preclude activation of any of such switches. As mentioned above, the positive terminal switch 70 and the negative terminal switch 72 in one embodiment are each biased to an open position. Furthermore, the battery disconnect switch 112 in one embodiment is biased to closed position and the terminal shunt switch 114 is biased to an open position. This intermediate position between the disengaged position and the engaged position ensures the terminal shunt switch 114 opens before the positive terminal switch 70 or the negative terminal switch 72 close to prevent inadvertent discharge of the battery 30 through the terminal shunt resistor 120. Additionally, closing the battery disconnect switch 112 permits the current limit 60 and the voltage limit 50 to energize in advance of activation of the positive terminal switch 70 and the negative terminal switch 72.

FIG. 4c illustrates operation of the switches 70, 72, 112, 114 when the operation member 80 is in the engaged position. As shown, when in the engaged position, the operation member 80 places the magnets 100, 102 away from the battery disconnect switch 112 and the terminal shunt switch 112 allowing them to be in their normally closed and normally open positions respectively. In particular, the operation member 80 places the magnet 100 in close proximity to the positive terminal switch 70 to activate and close the positive terminal switch 70. Further, the operation member places the magnet 102 in close proximity to the negative terminal switch 72 to activate and close the negative terminal switch 72. With both the positive terminal switch 70 and the negative terminal switch 72 closed, the battery 30 may energize the positive battery pack terminal 22 and the negative battery pack terminal 24 are energized and current may flow from the battery 30 to the load 12.

Due to the selection of the battery disconnect switch 112 as a normally closed switch and the positive terminal switch 70, the negative terminal switch 72 and the terminal shunt switch 114 as normally open, the safety circuit 40 may maintain its protection even in the presence of a large, external magnetic field. In particular, a large external magnetic field may activate and close the positive terminal switch 70, the negative terminal switch 72 and the terminal shunt switch 114 while activating and opening the battery disconnect switch 112. Accordingly, the safety circuit 40, in the presence of the external magnetic field, disconnects the battery 30 from the load 12 and maintains the safety of the battery pack 110.

Figure 5:
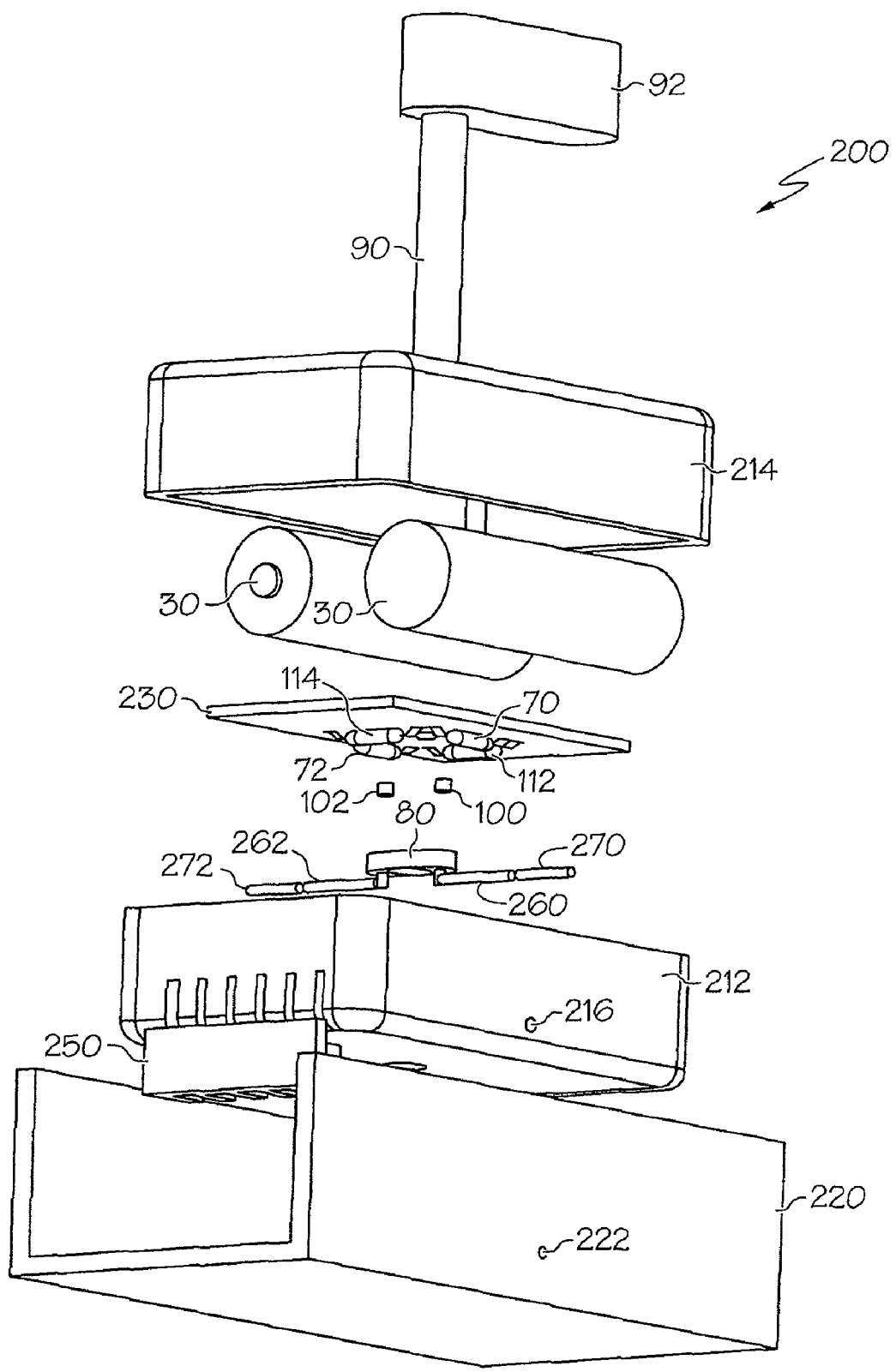
FIG. 5 shows mechanical aspects of a battery pack system that includes a battery pack holder and a battery pack.

Electrical aspects of the battery packs 10, 110 have been described above in regard to FIGS. 1-4. Mechanical aspects of one embodiment of the battery pack 110 are shown in FIG. 5 in regard to a battery pack system 200. The battery pack system 200 includes the battery pack 110 and a battery pack holder 220. However, the battery pack system 200 may also be implemented using the battery pack 10 of FIG. 1.

As shown, the battery pack 110 include the housing 20, a circuit board 230, and an electrical connector 250. The housing 210 may be sized to enclose the battery or batteries 30, the circuit board 230 as well as other components of the battery pack 110 such as the operation member 80.

The electrical components of the safety circuit 140 may be mounted to the circuit board 230. For example, in one embodiment the thermal switch 50, the fuse 52, the current limit 60, the voltage limit 50, the positive terminal switch 70, the negative terminal switch 72, the battery disconnect switch 112, the terminal shunt switch 114, and the terminal shunt resistor 120 are mounted to the circuit board 230. The circuit board 230 may further have mounted thereto or otherwise connected thereto the battery interface terminals 42, 44. The battery interface terminals 42, 44 may engage or otherwise electrically connect to battery terminals 32, 34 of the battery 30 thus connecting the battery 30 to the components of the safety circuit 140.

The battery pack housing 20 may house the battery 30 and the circuit board 230. The housing 20 may further define an external surface that has been sized to be received by the battery pack holder 220. The housing 20 may include a lower portion 212 and an upper portion 214. In one embodiment, the lower housing portion 212 defines a female portion of the battery pack housing 20 that is configured to receive a male portion of the housing 20 defined by the upper housing portion 214. However, in other embodiments the lower portion 212 and upper portion 214 may mechanically engage each other using other techniques. For example, the upper portion 214 may define the female portion and the lower portion 212 may define the male portion of the battery pack housing 20.

The electrical connector 250 may detachably couple the battery pack terminals 22, 24 to the load 12 when the battery pack 110 is placed in the battery pack holder 220. As shown, the electrical connector 250 may be coupled to or otherwise attached to the lower portion 212 of the housing 20.

The operation shaft 90 may extend through the upper housing portion 214 to the lower housing portion 212 passing between the batteries 30 and through the circuit board 230. An operation handle 92 may be coupled to the operation shaft 90 to rotate the shaft 90 between an engaged position and a disengaged position. The operation member 80 may also be attached to the operation shaft 90 to rotate the operation member 80 when the operation handle 92 is rotated.

As mentioned above, the operation member 80 may comprise a rod, cylinder, or some other shaped component having distal portions 82, 84 that rotate about the operation shaft 90. The operation member 80 may further include magnets 100, 102 positioned radially away from the operation shaft 90 and near the distal ends 82, 84 of the operation member 80.

Engagement members 260, 262 may be attached to the operation member 80, and locking members 270, 272 may be flexibly attached to engagement members 260, 262. The engagement members 260, 262 may position the locking members 270, 272 such the locking members 270, 272 slidably engage and extend through openings 216 of the housing 20 and openings 222 of the battery pack holder 220 when the operation handle 92 is in the engaged position. Thus, when engaged, the locking members 270, 272 lock the battery pack housing 20 to the battery pack holder 220 and prevent the removal of the battery 30 from the battery pack housing 20. Additionally, if the operation handle 92 is in the engaged position while the battery pack 110 is removed from the battery pack holder 220, the engagement members 260, 262 extend the locking members 270, 272 such that locking member 270, 272 prevent the battery pack 110 from being inserted into the battery pack holder 220. Furthermore, the extended locking member 270, 272 in conjunction with the operation handle 92 prevent the upper portion 214 of the housing 20 from being removed from the lower portion 212 and thereby prevent replacement of the battery 30 while the operation handle 92 is in the engaged position.

The operation member 80 via the engagement members 260, 262 may further retract the locking members 270, 272 from the openings 216 and 222 when the operation handle 92 is in the disengaged position. As a result of retracting the locking members 270, 272, the battery pack housing 210 may be removed from the battery pack holder 220. Moreover, as a result of retracting the locking members 270, 272, the upper portion 214 may be removed from the lower portion 212 of the housing 20 to permit replacement of the battery 30 when the operation handle 92 is in the disengaged position.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

What is claimed is:

1. A battery pack to power a load having an associated battery pack holder, comprising
   a plurality of battery pack terminals to deliver power to the load,
   an operation handle moveable between an engaged position and a disengaged position,
   an operational member coupled to the operation handle, and one or more magnets coupled to the operation member,
   a safety circuit comprising one or more battery interface terminals having a plurality of switches that are magnetically activated, the safety circuit selectively couples power to the battery pack terminals based upon selective activation of the plurality of switches, and the operation member positions the one or more magnets with respect to the plurality of switches to selectively activate the plurality of switches based upon the position of the operation handle, and
   a locking member to prevent removal of the battery pack from the battery pack holder if the operation handle is in the engaged position.

2. The battery pack of claim 1, further comprising a battery coupled to the one or more battery interface terminals to supply power to the load via the safety circuit and the plurality of battery pack terminals.

3. The battery pack of claim 1, further comprising a battery pack housing to receive the battery, safety circuit and locking member, wherein
   the locking member extends beyond the housing to and engages the battery pack holder to prevent removal of the battery pack from the battery pack holder if the operation handle is placed in the engaged position.

4. The battery pack of claim 1, further comprising a battery pack housing to receive the battery, safety circuit and locking member, wherein
   the locking member extends beyond the battery pack housing and prevents insertion of the battery pack into the battery pack holder if the operation handle is placed in the engaged position.

5. The battery pack of claim 1, wherein
   at least one switch of the plurality of switches is biased in an open position and activates to a closed position in response to the operation member placing a magnet of the one or more magnets in close proximity, and
   at least one switch of the plurality of switches is biased in a closed position and activates to an open position in response to the operation member placing a magnet of the one or more magnets in close proximity.

6. The battery pack of claim 5, wherein the safety circuit further comprises
   a current limit to limit current flow to the battery pack terminals, and
   a voltage limit to limit voltage across the battery pack terminals.

7. The battery pack of claim 6, wherein the safety circuit further comprises a thermal switch biased in a closed position, the thermal switch to activate to an open position that decouples a battery from the plurality of battery pack terminals in response to a thermal condition of the battery pack exceeding a temperature threshold associated with an upper limit of a safe operating range.

8. The battery pack of claim 5, wherein
   the safety circuit further comprising a shunt resistor,
   the plurality of switches includes a terminal shunt switch biased to an open position,
   the shunt resistor is coupled to the plurality of battery pack terminals via the terminal shunt switch, and
   the operation member positions the one or more magnets such that the terminal shunt switch is activated to closed position when the operation handle is in the disengaged position.

9. The battery pack of claim 5, wherein
the plurality of switches includes a positive terminal switch and a negative terminal switch that are each biased in a open position,
the positive terminal switch is positioned in series with a positive battery terminal of the safety circuit and a positive battery pack terminal of the plurality of battery pack terminals,
the negative terminal switch is position in series with a negative battery terminal of the safety circuit and a positive battery pack terminal of the plurality of battery pack terminals, and
the operation member positions the one or more magnets such that the positive terminal switch and the negative terminal switch are activated to a closed position when the operation handle is in the engaged position.

10. The battery pack of claim 5, wherein the safety circuit further comprises a shunt resistor,
the plurality of switches includes a terminal shunt switch biased to an open position, a positive terminal switch biased to an open position, a negative terminal switch biased to an open position, and a battery disconnect switch biased to a closed position,
the shunt resistor is coupled to the plurality of battery pack terminals via the terminal shunt switch,
the positive terminal switch is positioned in series with a positive battery terminal of the safety circuit and a positive battery pack terminal of the plurality of battery pack terminals,
the negative terminal switch is position in series with a negative battery terminal of the safety circuit and a negative battery pack terminal of the plurality of battery pack terminals,
the battery disconnect switch is positioned in series with negative battery terminal and the negative battery pack terminal, and
the operation member positions the one or more magnets such that the positive terminal switch, negative terminal switch, and terminal shunt switch are deactivated and open, and the battery disconnect switch is deactivated and closed when the operation handle is in an intermediate position between the disengaged position and the engaged position.

11. A battery pack system to power a load, comprising
a battery pack comprising a safety circuit, a battery, an operation member, at least one locking member, at least one battery pack terminal, and a housing to house the safety circuit, the battery, and the operation member, and
a battery pack holder associated with the load, the battery pack holder to receive the battery pack and to couple the at least one battery pack terminal to the load,
the battery pack holder further comprising at least one opening positioned to receive the at least one locking member, wherein the battery pack further comprises an operation handle external to the housing and coupled to the operation member via an operation shaft that passes through the housing,
the safety circuit selectively couples power supplied by the battery to the at least one battery terminal based upon position of the operation handle, and
the operation member rotates about the operation shaft as the operation handle moves between an engaged position and a disengaged position, extends the at least one locking member into the at least one opening of battery pack holder when the operation handle is in the engaged position, and retracts the at least one locking member from the at least one opening of the battery pack holder when the operation handle is in the disengaged position.

12. The battery pack system of claim 11, wherein,
the housing comprises an upper portion and a lower portion detachably coupled to the upper portion, and
the operation handle, operation shaft and at least one locking member prevent removal of the upper portion from the lower portion when the at least one locking member is extended through the at least one opening of the battery pack holder.

13. The battery pack system of claim 11, wherein the operation member, in response to the operation handle being in the engaged position, extends the locking member beyond the housing of the battery pack to prevent insertion of the battery pack into the battery pack holder.

14. The battery pack system of claim 11, wherein
the safety circuit comprises a plurality of switches that are magnetically activated,
the safety circuit selectively couples power to the at least one battery pack terminal based upon selective activation of the plurality of switches, and
the operation member comprising one or more magnets and positions the one or more magnets with respect to the plurality of switches to selective activate the plurality of switches based upon the position of the operation handle.

15. The battery pack system of claim 11, wherein
the safety circuit further includes a shunt resistor, a terminal shunt switch biased to an open position, a positive terminal switch biased to an open position, a negative terminal switch biased to an open position, and a battery disconnect switch biased to a closed position,
the shunt resistor is coupled to the at least one battery pack terminal via the terminal shunt switch,
the positive terminal switch is positioned in series with a positive battery terminal of the battery and a positive battery pack terminal of the at least one battery pack terminal,
the negative terminal switch is position in series with a negative battery terminal of the battery and a negative battery pack terminal of the at least one battery pack terminal,
the battery disconnect switch is positioned in series with the positive battery terminal of the battery and the positive battery pack terminal, and
the operation member comprises one or more magnets and positions the one or more magnets such that the positive terminal switch, negative terminal switch, and terminal shunt switch are deactivated and open, and the battery disconnect switch is deactivated and closed when the operation handle is in an intermediate position between the disengaged position and the engaged position.

16. A battery pack to power a load having an associated battery pack holder, the battery pack comprising
a housing defining an external surface that is sized to be received by the battery pack holder,
a plurality of battery pack terminals external to the housing,
a battery in the housing to supply power to the load,
an operation handle external to the housing and coupled to an operation member in the housing via an operation shaft that passes through the housing, said operation handle being configured to have an engaged and disengaged position, a circuit board in the housing, the circuit board comprising a safety circuit having a plurality of magnetically activated switches that selectively couple the battery to the plurality of battery pack terminals based upon a magnetic field based upon a position of the operation handle, and a plurality of locking members coupled to the operation member, wherein the operation member comprises at least one magnet and positions the at least one magnet with respect to the plurality of magnetically activated switches such that the plurality of magnetically activated switches couple the battery to the plurality of battery pack terminals when the operation handle is in the engaged position and decouple the battery from the plurality of battery pack terminals when the operation handle is in the disengaged position.

17. The battery pack of claim 16, wherein the operation members prevent the battery pack from being removed from the battery pack holder while the operation handle is in the engaged position.

18. The battery pack of claim 16, wherein the operation members prevent the battery pack from being inserted into the battery pack holder while the operation handle is in the engaged position.

* * * * *